United States Patent
Chang et al.

(10) Patent No.: US 8,249,354 B2
(45) Date of Patent: Aug. 21, 2012

(54) SYSTEM AND METHOD FOR FINDING EDGE POINTS OF AN OBJECT

(75) Inventors: Chih-Kuang Chang, Taipei Hsien (TW); Xian-Yi Chen, Shenzhen (CN); Dong-Hai Li, Shenzhen (CN); Zhong-Kui Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1024 days.

(21) Appl. No.: 12/202,390

(22) Filed: Sep. 1, 2008

(65) Prior Publication Data

US 2009/0169111 A1    Jul. 2, 2009

(30) Foreign Application Priority Data

Dec. 27, 2007   (CN) .......................... 2007 1 0203474

(51) Int. Cl.
 *G06K 9/48*   (2006.01)
 *G06K 9/46*   (2006.01)
(52) U.S. Cl. ........ 382/199; 382/141; 382/144; 382/145; 382/152; 382/181; 382/209; 382/214; 382/217; 382/266
(58) Field of Classification Search .............. 382/199, 382/141, 144, 145, 152, 181, 209, 214, 217, 382/266, 305
See application file for complete search history.

(56) References Cited

U.S. PATENT DOCUMENTS

| | | | | | |
|---|---|---|---|---|---|
| 4,747,153 | A * | 5/1988 | Kouno et al. | ................. | 382/203 |
| 5,280,530 | A * | 1/1994 | Trew et al. | ..................... | 382/103 |
| 5,365,251 | A * | 11/1994 | Denber | ......................... | 345/611 |
| 6,226,393 | B1 * | 5/2001 | Grunkin et al. | ............... | 382/128 |
| 7,133,572 | B2 * | 11/2006 | Neubauer et al. | ............. | 382/282 |
| 7,660,455 | B2 * | 2/2010 | Yamamoto et al. | .......... | 382/141 |
| 7,817,844 | B2 * | 10/2010 | Kitamura et al. | ............. | 382/141 |
| 2004/0066964 | A1 * | 4/2004 | Neubauer et al. | ............. | 382/152 |
| 2006/0045326 | A1 * | 3/2006 | Toyoda et al. | ................. | 382/145 |
| 2006/0110042 | A1 * | 5/2006 | Onishi et al. | .................. | 382/199 |
| 2006/0285740 | A1 * | 12/2006 | Okita | ............................ | 382/151 |
| 2007/0183666 | A1 * | 8/2007 | Ding | ............................. | 382/199 |
| 2008/0025616 | A1 * | 1/2008 | Bryll | ............................. | 382/209 |

OTHER PUBLICATIONS

Cox, et al. "Invariance in Template Matching." (1993): 1-5. Print.*

* cited by examiner

*Primary Examiner* — Michael A Newman
(74) *Attorney, Agent, or Firm* — Altis Law Group, Inc.

(57) ABSTRACT

A method for finding edge points of an object is disclosed. The method includes receiving an electronic image of an object, selecting one or more edge points in the image of the object, creating an image template for each edge point in the object image. The method further includes receiving a command to measure a second object of the same kind as the object and obtaining a measured object image, reading the image templates for the same kind of object from the storage device, and finding a matched sub-image to each image template from the measured object image according to an image matching algorithm, obtaining a central point of each matched sub-image and displaying coordinates of the central point of the matched sub-image.

8 Claims, 2 Drawing Sheets

SYSTEM AND METHOD FOR FINDING EDGE POINTS OF AN OBJECT

BACKGROUND

1. Field of the Invention

Embodiments of the present disclosure relate to systems and methods for measuring images, and particularly to a system and method for finding edge points of an object.

2. Description of Related Art

Measurement is an important phase in the manufacturing process and is closely interrelated to the product quality of an object. To measure an edge of an object, one or more edge points needs to be selected to be measured. Generally, an engineer will use an image measuring machine to obtain an electronic image of an object. The image is stored in a computer and a program is used to determine edge points of the object according to data of pixel points in the image.

However, if the image is fuzzy, particularly at the edges of the object, then the edge points may not be determined accurately by this method. When this happens, the engineer may try to select the edge points manually, but this way can easily result in errors.

What is needed, therefore, is a system and method for accurately and efficiently finding edge points of an object.

SUMMARY

A computer-implemented method for finding edge points of an object is provided. The method includes: receiving an electronic image of an object; selecting one or more edge points of the object in the image of the object; creating an image template for each edge point in the object image and storing the image template into a storage device, the image template including the edge point and points around the edge point; receiving a command to measure a second object of the same kind as the object and obtaining a measured object image; reading the image templates of the object from the storage device, and finding a matched sub-image in the measured object image for each image template according to an image matching algorithm; generating edge points of the measured object image by obtaining a central point of each matched sub-image; displaying coordinates of the edge points of the measured object image.

Other systems, methods, features, and advantages of the present disclosure will become apparent to one with skill in the art upon examination of the following drawings and detailed description.

DETAILED DESCRIPTION OF CERTAIN INVENTIVE EMBODIMENTS

All of the processes described below may be embodied in, and fully automated via, software code modules executed by one or more general purpose computers or processors. The code modules may be stored in any type of computer-readable medium or other computer storage device. Some or all of the methods may alternatively be embodied in specialized computer hardware.

As used herein, the term, "object" is defined as any three-dimensional object that can be measured by a measuring machine. As non-limiting examples, an object may include a book, a workpiece object, or a computer chassis.

Figure 1:
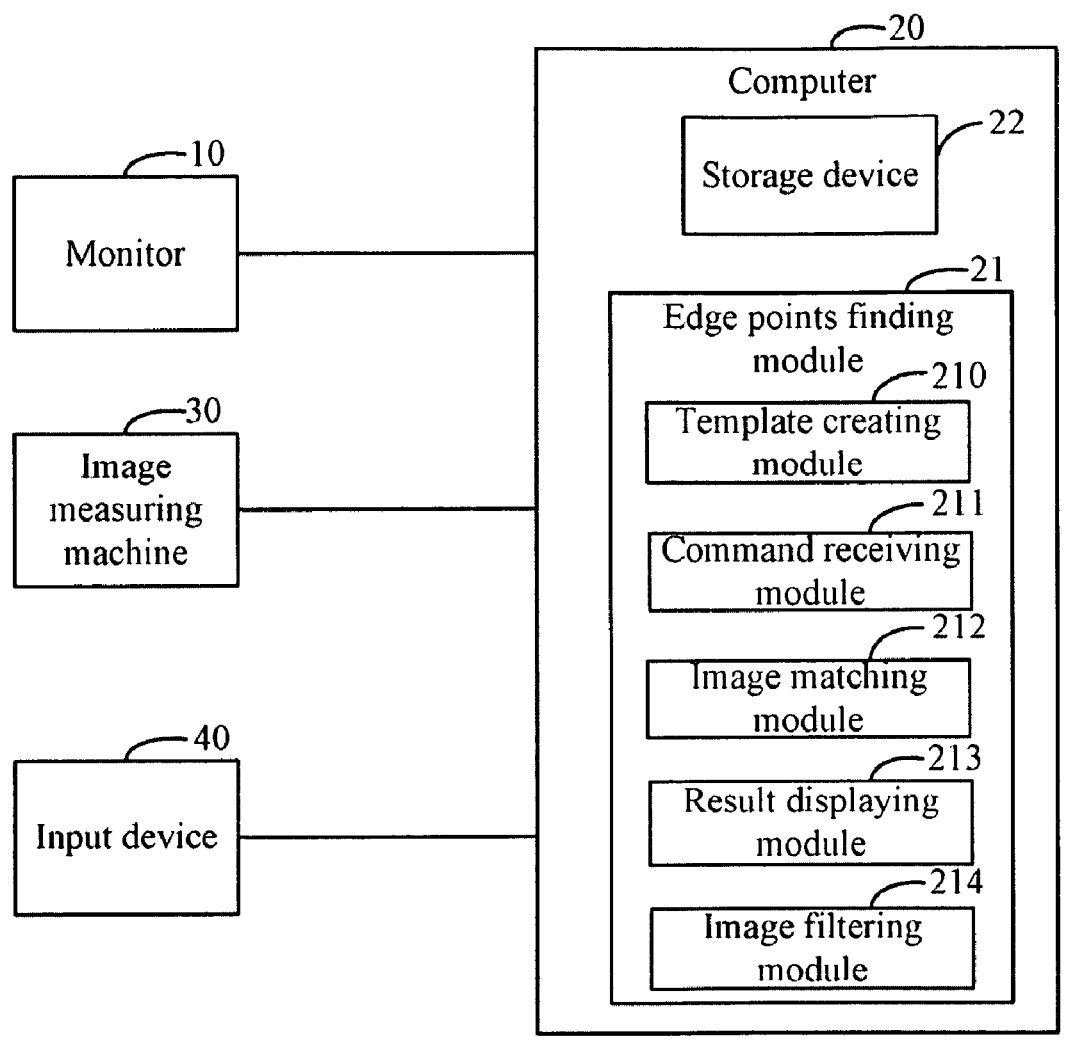
FIG. 1 is a block diagram of one embodiment of a system for finding edge points of an object.

FIG. 1 is a block diagram of one embodiment of a system for finding edge points of an object. In one embodiment, the system includes a monitor 10, a computer 20, an image measuring machine 30, and an input device 40. The computer 20 includes a storage device 22 and an edge points finding module 21. The image measuring machine 30 is connected to the computer 20 and configured for obtaining an electronic image of an object (hereinafter, "the object image"), and sending the object image to the computer 20. The edge points finding module 21 is configured for creating an image template for each edge point in the object image, and storing the image template in the storage device 22. The edge points finding module 21 obtains a measured object image, reads the image templates of the same kind of object from the storage device, finds a matched sub-image for each image template from the measured object image, and generates edge points of the measured object image by obtaining a central point of each matched sub-image. It is noted that an object image is constructed by a plurality of sub-images.

The monitor 10 is connected to the computer 20 and configured for displaying the object image obtained by the image measuring machine 30 and the edge points found by the edge points finding module 21. The input device 40 is connected to the computer 20 and configured for inputting data in the process of finding the edge points in the object image.

The edge points finding module 21 may include a template creating module 210, a command receiving module 211, an image matching module 212, a result displaying module 213, and an image filtering module 214. The modules 210, 211, 212, 213, 214 may be used to execute one or more operations of the edge finding module 21.

The template creating module 210 is configured for receiving an electronic image of an object sent from the image measuring machine 30 and receiving one or more edge points of the object in the image of the object that are selected manually. The template creating module 210 is further configured for creating an image template for each edge point in the object image and storing the image templates into the storage device 22. Each image template includes an edge point and points around the edge point. The points around the edge point include pixel points in a rectangle with a specified height value and width value, wherein a central point of the rectangle is regarded as the edge point. Next time, when an object of one kind is measured, the image matching module 212 reads all the image templates of the same kind of object from the storage device 22, finds a matched sub-image for each image template from the measured object image.

The command receiving module 211 is configured for receiving a command to measure a second object of the same kind as the object and obtaining a measured object image.

The image matching module 212 is configured for reading the image templates of the same kind of object from the storage device 22, finding a matched sub-image for each image template from the measured object image according to an image matching algorithm, and generating edge points of the measured object image by obtaining a central point of each matched sub-image. A detailed descriptions for finding a matched sub-image for an image template from a measured object image are as follows.

If "T" represents a image template for an edge point of an object image with a height "N" and a width "M," then a size of the image template "T" is "M×N". If "S" represents a substantially similar type of object image to be measured with a height "W" and a width "L," then a size of the measured object image "S" is "L×W". The image matching module 212 puts the image template "T" on the measured object image "S," and determines an similarity value between the image template "T" and a sub-image "Si,j" of the measured object image "S" under the image template "T." If the similarity value between the image template "T" and the sub-image "Si,j" is greater than a pre-established threshold value, the image matching module 212 determines that the sub-image "Si,j" is the matched sub-image for the image template "T." Two formulas for determining the similarity value between the image template "T" and the sub-image "Si,j" are as follows.

$$D(i, j) = \sum_{m=1}^{M} \sum_{n=1}^{N} [S_{i,j}(m, n) - T(m, n)]^2 \text{ or} \quad (1)$$

$$D(i, j) = \sum_{m=1}^{M} \sum_{n=1}^{N} |S_{i,j}(m, n) - T(m, n)| \quad (2)$$

In the formulas (1) and the formula (2), "D" represents a pixel point in an image (e.g., the image template "T" or the measured object image "S"), "D(i,j)" represents a similarity value, "i" represents an X-axis coordinate of the pixel point "D," "j" represents a Y-axis coordinate of the pixel point "D." The following descriptions take the formula (1) to determine the similarity value. The following formula (3) is expanded from the formula (1).

$$D(i, j) = \sum_{m=1}^{M} \sum_{n=1}^{N} [S_{i,j}(m, n)]^2 - \quad (3)$$
$$2 \sum_{m=1}^{M} \sum_{n=1}^{N} S_{i,j}(m, n) \times T(m, n) + \sum_{m=1}^{M} \sum_{n=1}^{N} [T(m, n)]^2$$

In the formula (3), the first element of $$\text{"} \sum_{m=1}^{M} \sum_{n=1}^{N} [S_{i,j}(m, n)]^2 \text{"}$$

represents energy of a sub-image Si,j of the measured object image "S" under the image template "T," wherein the energy of the sub-image Si,j is a variable. The second element of $$\text{"} 2 \sum_{m=1}^{M} \sum_{n=1}^{N} S_{i,j}(m, n) \times T(m, n) \text{"}$$

represents an interactive energy between the image template "T" and the sub-image Si,j, wherein the interactive energy is a variable. The third element of $$\text{"} \sum_{m=1}^{M} \sum_{n=1}^{N} [T(m, n)]^2 \text{"}$$

represents a total energy of the image template "T," wherein the total energy of the image template "T" is a constant. The interactive energy of the second element in the formula (3) reaches a maximal value if the sub-image Si,j matches the image template "T." Thus, the following formula (4) is used to determine the similarity value.

$$R(i, j) = \frac{\sum_{m=1}^{M} \sum_{n=1}^{N} S_{i,j}(m, n) \times T(m, n)}{\sum_{m=1}^{M} \sum_{n=1}^{N} [S_{i,j}(m, n)]^2} \quad (4)$$

A formula (5) normalized by the formula (4) is as follows.

$$R(i, j) = \frac{\sum_{m=1}^{M} \sum_{n=1}^{N} S_{i,j}(m, n) \times T(m, n)}{\sqrt{\sum_{m=1}^{M} \sum_{n=1}^{N} [S_{i,j}(m, n)]^2} \sqrt{\sum_{m=1}^{M} \sum_{n=1}^{N} [T(m, n)]^2}} \quad (5)$$

According to the Schwarz inequality, a value of R(i, j) should be greater than or equal to zero and less than or equal to 1. The formula (5) reaches a maximal value (i.e., equal to 1) if Si,j(m,n)/T(m,n) is a constant. If the value of R(i, j) in the formula (5) is greater than a pre-established threshold value, the image matching module 212 determines that the sub-image Si,j is the matched sub-image for the image template "T." Otherwise, the image matching module 212 determines that a matched sub-image for the image template "T" has not been found in the measured object image "S."

The result displaying module 213 is configured for displaying coordinates of the central point of the matched sub-image, which are regarded as edge points in the object image.

The image filtering module 214 is configured for filtering noises in each image template according to an image filtering algorithm after the image template is created. The image filtering algorithm may be a Median Filtering Algorithm or other suitable algorithms.

The image filtering module 214 is further configured for filtering noises in the measured object image according to the image filtering algorithm, before the image matching module 212 finds a matched sub-image to each image template from the measured object image.

Figure 2:
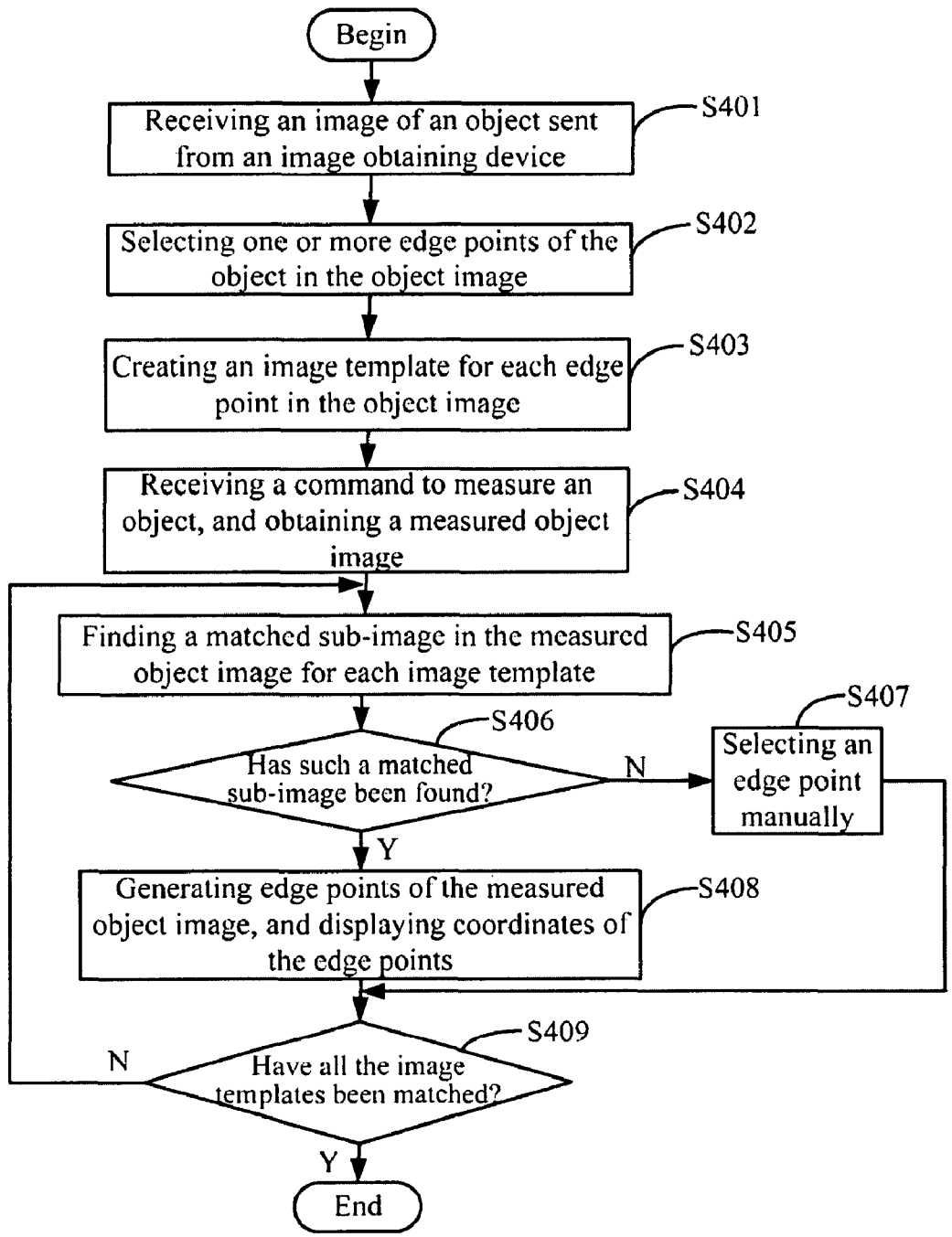
FIG. 2 is a flowchart of one embodiment of a method for finding edge points of an object.

FIG. 2 is a flowchart of one embodiment of a method for finding edge points of an object. The method of FIG. 2 may be used to determine edge points of an object using an electronic image of the object. Depending on the embodiment, additional blocks may be added, others removed, and the ordering of the blocks may be changed.

In block S401, the template creating module 210 receives an electronic image of an object sent from the image measuring machine 30. In block S402, the template creating module 210 receives one or more edge points of the object in the image of the object that may be selected manually in one embodiment.

In block S403, the template creating module 210 creates an image template for each edge point in the object image, and stores the image templates into the storage device 22. Each image template includes an edge point and points around the edge point. The points around the edge point include pixel points in a rectangle with a specified height value and width value, wherein a central point of the rectangle is regarded as the edge point. Next time, when an object of the same kind needs to be measured, the image matching module 212 reads all the image templates of the same kind of object from the storage device 22, finds a matched sub-image for each image template from the measured object image.

In block S404, the command receiving module 211 receives a command to measure a second object of the same kind as the object and obtaining a measured object image. It may be understood that the storage device 22 comprises a plurality of image templates. The edge points in the measured object image may be compared to one or more substantially similar or substantially identical image templates in the storage device 22 as will be further described herein.

In block S405, the image matching module 212 reads one or more image templates of the same kind of object (i.e., an image template that is either substantially the same or substantially similar to each edge point in the measured object image) from the storage device 22, and finds a matched sub-image in the measured object image for each image template according to an image matching algorithm by using the method described above In block S406, the image matching module 212 determines if such a matched sub-image has been found in block S405. If such a matched sub-image has not been found, the procedure goes to block S407. Otherwise, the procedure goes to block S408.

In block S407, an edge point of the measured object image is selected manually, then the procedure goes to block S409.

In block S408, the image matching module 212 generates edge points of the measured object image by obtaining a central point of the matched sub-image, and the result displaying module 213 displays coordinates of the central point of the matched sub-image on the, which are regarded as edge points in the object image, then the procedure goes to block S409.

In block S409, the image matching module 212 determines if all the image templates have been matched. If all the image templates have been matched, the procedure ends. If any image template has not been matched, the image matching module 212 further finds a matched sub-image to the next image template from the measured object image, the procedure goes to block S405.

In other embodiments, the method may further include filtering noises in each image template according to an image filtering algorithm after the image template is created, and filtering noises in the measured object image according to the image filtering algorithm before finding a matched sub-image to each image template from the measured object image. The image filtering algorithm may be a Median Filtering Algorithm or other suitable algorithm.

It should be emphasized that the above-described embodiments of the present disclosure, particularly, any preferred embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for finding edge points of an object, the method comprising:
receiving an electronic image of the object;
selecting one or more edge points of the object in the image of the object;
creating an image template for each edge point in the image of the object and storing the image template into a storage device, the image template comprising the edge point and points around the edge point, wherein the points around the edge point comprise pixel points in a rectangle having a specified height value and width value, and a central point of the rectangle that is regarded as the edge point;
receiving a command to measure a second object of the same kind as the object and obtaining a measured object image;
reading the image templates of the object from the storage device, and finding a matched sub-image in the measured object image for each image template according to an image matching algorithm, comprising:
putting the image template on the measured object image;
determining a similarity value between the image template and a sub-image of the measured object image under the image template using a preset formula, the preset formula comprising:
a first formula of $$D(i, j) = \sum_{m=1}^{M} \sum_{n=1}^{N} [S_{i,j}(m, n) - T(m, n)]^2 \quad \text{or} \tag{1}$$

a second formula of $$D(i, j) = \sum_{m=1}^{M} \sum_{n=1}^{N} |S_{i,j}(m, n) - T(m, n)|, \tag{2}$$

wherein "T" represents the image template for an edge point of an object image having a height "N" and a width "M," "S" represents the measured object image, "$S_{i,j}$" represents the sub-image of the measured object image "S," "D" represents a pixel point in the image template "T" or the measured object image "S," "D(i, j)" represents a similarity value, "i" represents an X-axis coordinate of the pixel point "D," "j" represents a Y-axis coordinate of the pixel point "D";
determining that the sub-image is the matched sub-image for the image template upon the condition that the similarity value between the image template and the sub-image is greater than a re-established threshold value comprising:
obtaining a third formula by expanding the first formula (1);

$$D(i, j) = \sum_{m=1}^{M} \sum_{n=1}^{N} [S_{i,j}(m, n)]^2 - 2\sum_{m=1}^{M} \sum_{n=1}^{N} S_{i,j}(m, n) \times T(m, n) + \sum_{m=1}^{M} \sum_{n=1}^{N} [T(m, n)]^2; \tag{3}$$

obtaining a fourth formula according to the third formula (3);

$$R(i, j) = \frac{\sum_{m=1}^{M} \sum_{n=1}^{N} S_{i,j}(m, n) \times T(m, n)}{\sum_{m=1}^{M} \sum_{n=1}^{N} [S_{i,j}(m, n)]^2}; \tag{4}$$

obtaining a fifth formula by normalizing the fourth formula (4);

$$R(i, j) = \frac{\sum_{m=1}^{M} \sum_{n=1}^{N} S_{i,j}(m, n) \times T(m, n)}{\sqrt{\sum_{m=1}^{M} \sum_{n=1}^{N} [S_{i,j}(m, n)]^2} \sqrt{\sum_{m=1}^{M} \sum_{n=1}^{N} [T(m, n)]^2}}; \quad (5)$$

determining that the sub-image "$S_{i,j}$" is the matched sub-image for the image template "T" upon the condition that a value of R(i, j) in the fifth formula (5) is greater than the pre-established threshold value; or determining that a matched sub-image for the image template "T" has not been found in the measured object image "S" upon the condition that the value of R(i, j) in the fifth formula (5) is less than or equal to the pre-established threshold value;

generating edge points of the measured object image by obtaining a central point of each matched sub-image; and displaying coordinates of the edge points of the measured object image.

2. The method according to claim 1, further comprising:

filtering noises in each image template according to an image filtering algorithm after the image template is created; and filtering noises in the measured object image according to the image filtering algorithm before the finding a matched sub-image in the measured object image for each image template step.

3. The method according to claim 2, wherein the image filtering algorithm comprises a Median Filtering Algorithm.

4. A non-transitory computer-readable medium having stored thereon instructions that, when executed by a computer, causing the computer to:

receive an electronic image of an object;

select one or more edge points of the object in the image of the object;

create an image template for each edge point in the image of the object and storing the image template into a storage device, the image template comprising the edge point and points around the edge point, wherein the points around the edge point comprise pixel points in a rectangle having a specified height value and width value, and a central point of the rectangle that is regarded as the edge point;

receive a command to measure a second object of the same kind as the object and obtaining a measured object image;

read the image templates of the object from the storage device, and finding a matched sub-image in the measured object image for each image template according to an image matching algorithm, comprising:

putting the image template on the measured object image;

determining a similarity value between the image template and a sub-image of the measured object image under the image template using a preset formula, the preset formula comprising:

a first formula of $$D(i, j) = \sum_{m=1}^{M} \sum_{n=1}^{N} [S_{i,j}(m, n) - T(m, n)]^2 \text{ or} \quad (1)$$

a second formula of $$D(i, j) = \sum_{m=1}^{M} \sum_{n=1}^{N} |S_{i,j}(m, n) - T(m, n)|, \quad (2)$$

wherein "T" represents the image template for an edge point of an object image having a height "N" and a width "M," "S" represents the measured object image, "$S_{i,j}$" represents the sub-image of the measured object image "S," "D" represents a pixel point in the image template "T" or the measured object image "S," "D(i, j)" represents a similarity value, "i" represents an X-axis coordinate of the pixel point "D," "j" represents a Y-axis coordinate of the pixel point "D";

determining that the sub-image is the matched sub-image for the image template upon the condition that the similarity value between the image template and the sub-image is greater than a re-established threshold value comprising:

obtaining a third formula by expanding the first formula (1);

$$D(i, j) = \sum_{m=1}^{M} \sum_{n=1}^{N} [S_{i,j}(m, n)]^2 - \quad (3)$$

$$2\sum_{m=1}^{M} \sum_{n=1}^{N} S_{i,j}(m, n) \times T(m, n) + \sum_{m=1}^{M} \sum_{n=1}^{N} [T(m, n)]^2;$$

obtaining a fourth formula according to the third formula (3);

$$R(i, j) = \frac{\sum_{m=1}^{M} \sum_{n=1}^{N} S_{i,j}(m, n) \times T(m, n)}{\sum_{m=1}^{M} \sum_{n=1}^{N} [S_{i,j}(m, n)]^2}; \quad (4)$$

obtaining a fifth formula by normalizing the fourth formula (4);

$$R(i, j) = \frac{\sum_{m=1}^{M} \sum_{n=1}^{N} S_{i,j}(m, n) \times T(m, n)}{\sqrt{\sum_{m=1}^{M} \sum_{n=1}^{N} [S_{i,j}(m, n)]^2} \sqrt{\sum_{m=1}^{M} \sum_{n=1}^{N} [T(m, n)]^2}}; \quad (5)$$

determining that the sub-image "$S_{i,1}$" is the matched sub-image for the image template "T" upon the condition that a value of R(i, j) in the fifth formula (5) is greater than the pre-established threshold value; or determining that a matched sub-image for the image template "T" has not been found in the measured object image "S" upon the condition that the value of R(i, j) in the fifth formula (5) is less than or equal to the pre-established threshold value;

generate edge points of the measured object image by obtaining a central point of each matched sub-image; and display coordinates of the edge points of the measured object image.

5. The non-transitory computer-readable medium according to claim 4, wherein the medium is selected from the group consisting of a hard disk drive, a compact disc, a digital video disc, and a tape drive.

6. A computing system for finding edge points of an object, comprising:
- a template creating module configured for receiving an electronic image of an object and one or more edge points of the object in the image of the object, creating an image template for each edge point in the object image, and storing the image template into a storage device, the image template comprising the edge point and points around the edge point, wherein the points around the edge point comprise pixel points in a rectangle having a specified height value and width value, and a central point of the rectangle that is regarded as the edge point;
- a command receiving module configured for receiving a command to measure a second object of the same kind as the object and obtaining a measured object image;
- an image matching module configured for reading the image templates of the object from the storage device, finding a matched sub-image in the measured object image for each image template according to an image matching algorithm, comprising:
- putting the image template on the measured object image;
- determining a similarity value between the image template and a sub-image of the measured object image under the image template using a preset formula, the preset formula comprising:
- a first formula of $$D(i, j) = \sum_{m=1}^{M} \sum_{n=1}^{N} [S_{i,j}(m, n) - T(m, n)]^2 \quad \text{or} \tag{1}$$

a second formula of $$D(i, j) = \sum_{m=1}^{M} \sum_{n=1}^{N} |S_{i,j}(m, n) = T(m, n)|, \tag{2}$$

wherein "T" represents the image template for an edge point of an object image having a height "N" and a width "M," "S" represents the measured object image, "$S_{i,j}$" represents the sub-image of the measured object image "S," "D" represents a pixel point in the image template "T" or the measured object image "S," "D(i, j)" represents a similarity value, "i" represents an X-axis coordinate of the pixel point "D," "j" represents a Y-axis coordinate of the pixel point "D";

determining that the sub-image is the matched sub-image for the image template upon the condition that the similarity value between the image template and the sub-image is greater than a pre-established threshold value comprising:

obtaining a third formula by expanding the first formula (I);

$$D(i, j) = \sum_{m=1}^{M} \sum_{n=1}^{N} [S_{i,j}(m, n)]^2 - 2\sum_{m=1}^{M} \sum_{n=1}^{N} S_{i,j}(m, n) \times T(m, n) + \sum_{m=1}^{M} \sum_{n=1}^{N} [T(m, n)]^2; \tag{3}$$

obtaining a fourth formula according to the third formula (3);

$$R(i, j) = \frac{\sum_{m=1}^{M} \sum_{n=1}^{N} S_{i,j}(m, n) \times T(m, n)}{\sum_{m=1}^{M} \sum_{n=1}^{N} [S_{i,j}(m, n)]^2}; \tag{4}$$

obtaining a fifth formula by normalizing the fourth formula (4);

$$R(i, j) = \frac{\sum_{m=1}^{M} \sum_{n=1}^{N} S_{i,j}(m, n) \times T(m, n)}{\sqrt{\sum_{m=1}^{M} \sum_{n=1}^{N} [S_{i,j}(m, n)]^2} \sqrt{\sum_{m=1}^{M} \sum_{n=1}^{N} [T(m, n)]^2}}; \tag{5}$$

determining that the sub-image "$S_{i,j}$" is the matched sub-image for the image template "T" upon the condition that a value of R(i, j) in the fifth formula (5) is greater than the pre-established threshold value; or determining that a matched sub-image for the image template "T" has not been found in the measured object image "S" upon the condition that the value of R(i, j) in the fifth formula (5) is less than or equal to the pre-established threshold value;

the image matching module further configured for generating edge points of the measured object image by obtaining a central point of each matched sub-image; and a result displaying module configured for displaying coordinates of the edge points of the measured object image.

7. The system according to claim 6, wherein the computer further comprises an image filtering module, wherein:
- the image filtering module is configured for filtering noises in each image template according to an image filtering algorithm after the image template is created; and
- the image filtering module is further configured for filtering noises in the measured object image according to the image filtering algorithm before the finding a matched sub-image in the measured object image for each image template step.

8. The system according to claim 7, wherein the image filtering algorithm comprises a Median Filtering Algorithm.

* * * * *